United States Patent [19]

Havera

[11] 3,879,393

[45] Apr. 22, 1975

[54] DERIVATIVES OF 1,3-DISUBSTITUTED 2,4(1H,3H)-QUINAZOLINEDIONES

[75] Inventor: Herbert John Havera, Edwardsburg, Mich.

[73] Assignee: Miles Laboratories, Inc., Elkhart, Ind.

[22] Filed: June 18, 1973

[21] Appl. No.: 371,277

[52] U.S. Cl.............. 260/256.4 Q; 260/293.69; 260/268 PC; 260/268 PH; 424/251
[51] Int. Cl............................................. C07d 51/48
[58] Field of Search ............................ 260/256 HQ

[56] References Cited
UNITED STATES PATENTS

| | | | |
|---|---|---|---|
| 3,274,194 | 9/1966 | Heyao | 260/256.4 Q |
| 3,652,567 | 3/1972 | Boltze et al. | 260/256.4 Q |
| 3,718,648 | 2/1973 | Beyerle et al. | 260/256.4 Q |

OTHER PUBLICATIONS
Grout et al., J. Chem. Soc., 1960, pp. 3546–3547.

Primary Examiner—Donald G. Daus
Assistant Examiner—David E. Wheeler

[57] ABSTRACT

The disclosed derivatives of 1,3-disubstituted 2,4 (1H,3H)-quinazolinediones produce vasodilation in experimental animals. The 1,3-disubstitutions include, among others, 1-[alky(alkylamino)]- 1-(alkylpiperidyl)-, 3-[alkyl(alkylamino)]-, 3-[alkyl(4-phenyl-1-piperidyl]-, and 3-[alkyl(4-phenyl-1-piperazinyl)]-moieties. In the latter two substituents the phenyl group optionally is substituted with halogeno or loweralkyl groups. Additionally, the compounds optionally are substituted at carbon atoms 5 through 8 of the quinazolinedione nucleus with halogeno, nitro, alkoxy, and alkylamido substituents.

17 Claims, No Drawings

DERIVATIVES OF 1,3-DISUBSTITUTED 2,4(1H,3H)-QUINAZOLINEDIONES

BACKGROUND OF THE INVENTION

1. Field of the Invention

Vasodilation is defined as an increase in or the widening of the lumen of a blood vessel without regard to whether the latter is a member of the arterial or venous part of the circulatory system of animals. One of the principal physiological effects of vasodilation is a net increase of blood flow in the vascular bed of a tissue, organ, or system. Vasodilation can be induced in experimental animals and man by the administration of certain pharmacologically active agents known as vasodilators.

Vasodilation may be a therepeutic objective in certain vasopathies to correct inadequacies of regional blood flow, for example, in the cutaneous, muscular (skeletal or cardiac), or cerebral circulation and to adjust imbalances between tissue requirements and the delivery and removal of metabolic substances by the blood stream. Examples of conditions where vasodilation may be therapeutically desirable are: intermittent claudication, arteriosclerosis obliterans, Raynaud's phenomenon, Meniere's syndrome, thrombophlebitis, local frostbite, and nocturnal leg cramps.

Because all drugs which lower blood pressure do so by vasodilation, vasodilators are also useful in the treatment of hypertensive conditions regardless of etiological causes. The most frequent condition for which vasodilators are used is primary or essential hypertension.

From a pharmacodynamic standpoint, vasodilators may produce alpha adrenergic blockade, stimulate beta adrenergic receptors, or relax smooth muscle directly. Tolazoline and phentolamine are examples of vasodilators which block alpha adrenergic receptors. These compounds, however, cause undesirable side effects which are attributable to cardiac and gastric stimulation. Hence, tolazoline and phentolamine have been reported to cause tachycardia, cardiac arrhythmias, abdominal pain, nausea, diarrhea, and aggravation of peptic ulcers. Isoxsuprine and nylidrin are examples of vasodilators which stimulate beta adrenergic receptors. Although both drugs have been proposed for the treatment of a variety of peripheral vascular disorders, they may cause a variety of side effects such as nervousness, dizziness, palpitation, nausea, and vomiting. Among vasodilators which directly relax smooth muscle, papaverine, dioxyline and cyclandelate are representative. Papaverine and dioxyline, when administered in large doses, have been reported to cause serious arrhythmias because of depression of A-V and intraventrical conduction. Cyclandelate at 200 mg doses causes unpleasant side effects such as headache and dizziness in many cases. For a more detailed summary of the field, refer to: Nickerson, Mark, "Vasodilator Drugs," in *The Pharmacological Basis of Therapeutics*, 4th edition, L. S. Goodman and A. Gilman, editors, New York, MacMillan and Co., 1970, Chapters 33 and 34, pages 728–760.

2. Description of the Prior Art

The following references are indicative of the prior art pertaining to compounds containing the quinazoline nucleus and their pharmacological activity: U.S. Pat. No. 3,047,462 (July 31, 1962 to Maillard et al.) for 3-substituted-3,4-dihydroquinazol-4-ones possessing anti-inflammatory activity; U.S. Pat. No. 3,248,292 (Apr. 26, 1966 to Minielli and Scarborough) for 2,4-substituted-6,7-dimethoxyquinazoline compounds useful as bronchodilators and antiinflammatory agents; U.S. Pat. No. 3,591,695 (July 6, 1971 to Ott) disclosing certain CNS-active 4-phenyl-3,4-dihydroquinazolines useful as antidepressants; and U.S. Pat. No. 3,274,194 (Sept. 20, 1966 to Hayao et al.) for 3-substituted-2,4(1H,3H)-dioxoquinazoline compounds having antiinflammatory or sedative properties.

In standard pharmacological treatises, 2,3-disubstituted-quinazolines are described as hypnotics (e.g., see Sharpless, Seth K., "Hypnotics and Sedatives," in *The Pharmacological Basis of Therapeutics*, 4th edition, L. S. Goodman and A. Gilman, editors, New York, MacMillan and Co., 1970, Chapter 10, pages 122 and 131).

Quinethazone, which is 7-chloro-2-ethyl-1,2,3,4-tetrahydro-4-oxo-6-quinazoline-sulfonamide has been reported to have antihypertensive activity although it is primarily utilized as an diuretic (Gifford, Ray W., "Drugs for Arterial Hypertension," in *Drugs of Choice*, 1972–1973, W. Modell, Editor, the C. V. Mosby Co., 1972, Chapter 25, pages 386 and 387).

SUMMARY

Derivatives of 1,3-substituted 2,4(1H,3H)-quinazoline-diones represented by the formula

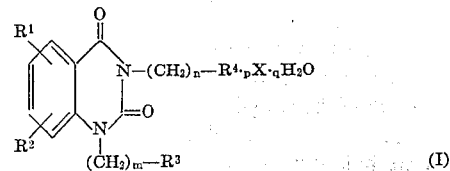

are the subject matter of this invention. The substituents and other parameters of Formula I are defined as follows:

$R^1$ and $R^2$ are hydrogen, halogeno, nitro, loweralkoxy, or loweralkylamido;

$m$ is an integer having a value of from 1 to 4;

$R^3$ is piperidyl, loweralkylamino, or diloweralkylamino;

$n$ is an integer having a value of from 1 to 8;

$R^4$ is loweralkylamino, diloweralkylamino,

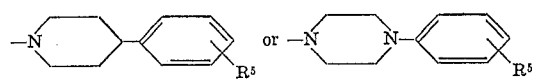

in which $R^5$ is hydrogen, loweralkyl, or halogeno;

X is a nontoxic, pharmacologically acceptable acid;

$p$ and $q$ are integers having a value of from 0 to 2; and the prefix "lower-" denotes one to three carbon atoms.

The following compounds, among others, are illustrative of preferred embodiments of structures represented by Formula I:

1. 1-[3-(N,N-dimethylamino)propyl]-3-[3-(4-m-chloro-phenyl-1-pyperazinyl)-propyl]-2,4(1H,3H)quinazolinedione dihydrochloride (TR 2479);

2. 1-[3-(N,N-dimethylamino)propyl]-3[3-(4-phenyl-1-piperazinyl)propyl]-2,4(1H,3H)quinazolinedione dihydro-chloride (TR 2957);

3. 1-[3-(N,N-dimethylamino)propyl]-3-[3-(4-phenyl-1-piperidyl)propyl]-2,4(1H,3H)-quinazolidedione dihydro-chloride (TR 2967);

4. 1-[3-(N,N-dimethylamino)propyl]-3-[2-(4-phenyl-1-piperazinyl)ethyl]-2,4(1H,3H)-quinazolinedione dioxalate (TR 2997);

5. 1-[3-(N,N-dimethylamino)propyl]-3-[6-(4-phenyl-1-piperazinyl)hexyl]-2,4(1H, 3H)quinazolinedione dioxalate (TR 3013);

6. 1-[3-(N,N-dimethylamino)propyl]-3[(N,N-dimethylamino)propyl]-2,4-(1H,3H)quinazolinedione dioxalate (TR 3027);

7. 6-chloro-1-[3-(N,N-dimethylamino)propyl]-3-[3-(4-phenyl-1-piperazinyl]-2,4-(1H,3H)quinazolinedione dioxalate (TR 3033);

8. 6-nitro-1-[3-(N,N-dimethylamino)propyl]-3-[3-(4-phenyl-1-piperazinyl)-propyl]-2,4(1H,3H)quinazolinedione dihydrochloride monohydrate (TR 3036);

9. 1-[3-(1-piperidyl)propyl]-3-[-3-(4-phenyl-1-piperazinyl)propyl]-2,4(1H,3H)quinazolinedione dioxalate (TR 3044);

10. 1-[2-(N,N-dimethylamino)ethyl]-3-[3-(4-phenyl-1-piperazinyl)propyl]-2,4(1H,3H)quinazolinedione dioxalate (TR 3049);

11. 6-acetamido-1-[3-(N,N-dimethylamino)propyl]-3-[3-(4-phenyl-1-piperazinyl)-propyl]-2,4(1H,3H)quinazolinedione dioxalate monohydrate (TR 3081);

12. 1-[3-(N,N-diethylamino)propyl]-3-[3-(4-phenyl-1-piperazinyl)propyl]-2,4(1H,3H)quinazolinedione dioxalate monohydrate (TR 3083);

13. 6,7-dimethoxy-1-8 3-(N,N-dimethylamino)propyl]-3-[3-(4-phenyl-1-piperazinyl)-propyl]-2,4(1H,3H)quinazolinedione dihydrochloride (TR 3094);

14. 1-[3-(N,N-dimethylamino)propyl]-3-[3-(4-o-methyl-phenyl-1-piperazinyl)-propyl]-2,4(1H,3H)quinazolinedione (TR 3128);

15. 1-[3-(N,N-dimethylamino)propyl]-3-[7-(4-phenyl-1-piperazinyl)hepthyl]-2,4(1H,3H)quinazolidione dioxalate methanolate (TR 3169);

16. 1-[3-(1-piperidyl)propyl]-3-[6-(4-phenyl-1-piperazinyl)hexyl]-2,4(1H,3H)quinazolinedione dioxalate (TR 3173); and 17. 1-[3-(N,N-dimethylamino)propyl]-3-[6-(4-m-chloro-phenyl-1-piperazinyl)-hexyl]-2,4(1H,3H)quinazolinedione dioxalate (IR 3171).

Compounds of Formula I have been synthesized according to the following reaction sequence in which the above definitions of $R^1$, $R^2$, $R^3$, $R^4$, m and n given for Formula I apply:

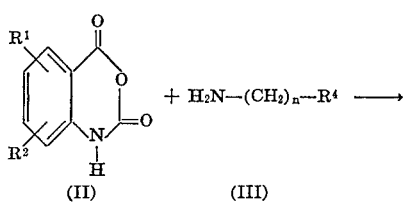

(II)        (III)

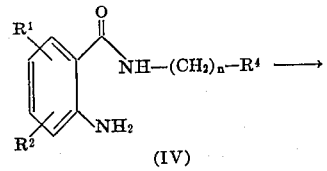

(IV)

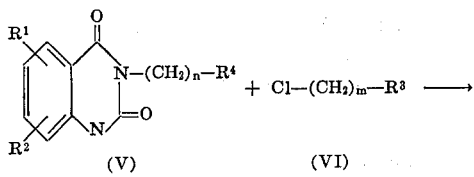

(V)        (VI)

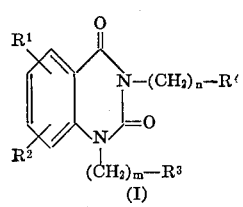

(I)

The reaction of V and VI was performed with the addition of NaH. In order to synthesize a derivative in which either or both $R^1$ and $R^2$ are loweralkylamido, a compound of formula V having one or two nitro substituents was reacted with hydrogen and acetic anhydride in the presence of a palladium/carbon catalyst.

The reaction of an isatoic anhydride (II) with a primary amine (III) to prepare an o-aminobenzamide (IV) has been reported by Clark and Wagner (J. Org. Chem., 9: 55 [1944]). The synthesis of 4-phenylpiperazines and 4-phenylpiperidines has been published by Pollard and MacDowell (J. Am. Chem. Soc., 56: 2199 [1934]; 76: 1853 [1954]) and Janssen et al. (J. Med. Pharm. Chem., 1: 281 [1959]), respectively. All other reagents are available commercially; all other reaction steps are well known synthetic procedures. (Hayao, U.S. Pat. No. 3,274,194 [1966]; Beyerle et al., U.S. Pat. No. 3,718,648 [1973]).

The derivatives of 1,3 disubstituted 2,4(As H,3H)-quinazolinediones represented by Formula I produce vasodilation in experimental animals and are therapeutically useful in the correction of hypertension and of deficiencies of peripheral circulation. Doses of Formula I compounds of from 4 to 3,000 mg increase the blood flow in the femoral bed of anesthetized dogs by 100 ml/min over control values, and doses of 31 mg/kg or greater decrease blood pressure in hypertensive rats. The compounds of this invention produce vasodilation by direct relaxation of vascular smooth muscle rather than by blockade of alpha adrenergic neurons. as demonstrated by Example 18 (see "Description of the Preferred Embodiments" below), these compounds are similar to or more effective than papaverine, yet do not inhibit responses to epinephrine Accordingly, this invention also relates to a method of producing vasodilation in an experimental animal, having hypertension or deficiencies of regional blood flow, which comprises administering to said animal an effective amount of a compound represented by Formula I. By "an effective amount" is meant a dose which is sufficient to produce vasodilation and hence a therapeutically desired state of normal blood pressure or an increase in blood flow. The compounds of this invention can be administered orally, rectally, intravenously, parenterally, and intramuscularly in a form suitable for such administration.

DESCRIPTION OF THE PREFERRED EMBODIMENTS

Example 1

1-[3-(N,N,-DIMETHYLAMINO)PROPYL]-3-[3-(4-m-CHLOROPHENYL-1-PIPERAZINYL)PROPYL]-2,4(1H,3H)-QUINAZOLINEDIONE DIHYDROCHLORIDE (TR 2479).

To a hot stirred suspension of 3-[3-(4-m-chlorophenyl-1-piperazinyl)propyl]2,4(1H,3H)-quinazolinedione (45 g, 0.11 mole) in 500 ml of xylene was added 5.6 g (0.11 mole) of NaH under nitrogen atmosphere. The reaction mixture was then stirred under reflux for 6 hours. The solution was cooled and another 5.6 g of NaH was added along with 18.0 g (0.11 mole) of 3-chloro-N,N-dimethylpropylamine hydrochloride. The resulting solution was stirred under reflux for another 18 hours, subsequently filtered, and the filtrate was concentrated in vacuo. The resulting oil was methanol. over silicic acid by elution with ethyl acetate and metnanol. 24 g of an oily free base was obtained. The hydrochloride was prepared by adding 50 ml of a 2.36N HCl solution in 2-propanol to the free base. The salt was recrystallized from 2-propanol and methanol: yield 23 g; m.p. 249°–50°C.

| Calculated for $C_{26}H_{36}Cl_3N_5O_2$: | C, 56.08; H, 6.53; N, 12.57 |
|---|---|
| Found: | C, 54.88; H, 6.42; N, 12.53 |

The 1-[3-(N,N-dimethylamino)propyl]-3-[3- (4-o-chlorophenyl-1-piperazinyl)-propyl]-and 1-[3-(N,N-dimethyl-aminopropyl]-3-[3-4-p-chlorophenyl-1-piperazinyl)-propyl]-2,4(1H,3H)-quinazolinedione are prepared similarly. The phenyl group can also be substituted in the ortho-, meta-, and para-positions with iodo, bromo, and fluoro groups.

EXAMPLE 2

1-[3-(N,N-DIMETHYLAMINO)PROPYL]-3-[3-(4-PHENYL-1-PIPERAZINYL)PROPYL]-2,4(1H,3H)QUINAZOLINEDIONE DIHYDRO-CHLORIDE (TR 2957)

To 10.9 g (0.03 mole) of 3-[3-(4-phenyl-1-pyperazyl)propyl]-2,4(1H,3H)-quinazolinedione in 150 ml of dry xylene was added 1.5 g (0.03 mole) of NaH with stirring under nitrogen. The reaction mixture was then heated under reflux for 5 hours. The solution was cooled and another 1.5 g of NaH was added along with 4.75 g (0.03 mole) of 3-chloro-N,N-dimethylpropylamine hydrochloride. The mixture was then heated under reflux with stirring for 18 hours. The solution was filtered while hot and the filtrate was concentrated in vacuo. The resulting oil solidified and the solid was recrystallized from 2-propanol: yield 8.0 g, m.p. 88°–90°C.

| Calculated for $C_{26}H_{35}N_5O_2$: | C, 69.46; H, 7.85; N, 15.58 |
|---|---|
| Found: | C, 70.14; H, 8.05; N, 15.85 |

To 7.8 g (0.017 mole) of the free base in $CH_3OH$ was added 5 ml of a 3.55N HCl solution in $CH_3OH$. Upon addition of ether a solid precipitated which was recrystallized from methanol and ether: yield 8.0 g; m.p. 257°–258°C.

| Calculated for $C_{26}H_{37}Cl_2N_5O_2$: | C, 59.76; H, 7.14; N, 13.40 |
|---|---|
| Found: | C, 59.41; H, 7.22; N, 13.64 |

EXAMPLE 3

1-[3-(N,N-DIMETHYLAMINO)PROPYL]-3-[3-(4-PHENYL-1PIPERIDYL)PROPYL]-2,4(1H,3H)QUINAZOLINEDIONE DIHYDROCHLORIDE (TR 2967)

To 19.0 g (0.052 mole) of 3-[3-(4-phenyl-1-piperidyl) propyl]-2,4-(1H,3H)quinazolinedione in 250 ml of dry xylene was added 2.5 g (0.05 mole) of NaH with stirring under nitrogen. The reaction mixture was then heated under reflux for 5 hours. The solution was cooled and another 2.5 g of NaH was added along with 8.2 g (0.05 mole) of 3 chloro-N,N-dimethylpropylamine hydrochloride. The reaction was then heated under reflux with stirring under nitrogen for 18 hours. The solution was filtered and the filtrate was concentrated in vacuo, leaving an oily residue which solidified. The solid was recrystallized from 2-propanol and Skelly B: yield 18.0 g; m.p. 105°–106°C.

| Calculated for $C_{27}H_{36}N_4O_2$: | C, 72.29; H, 8.09; N, 12.49 |
|---|---|
| Found: | C, 72.94; H, 8.39; N, 12.25 |

To the 18.0 g. of free base was added 30 ml of 2.69N HCl solution in 2-propanol. A white solid precipitated which was recrystallized from methanol-2-propanol-ether: yield 13.0 g; m.p. 272°–275°C.

| Calculated for $C_{27}H_{38}Cl_2N_4O_2$: | C, 62.18; H, 7.34; N, 10.74 |
|---|---|
| Found: | C, 61.92; H, 7.18; N, 10.61 |

EXAMPLE 4

1-[3-(N,N-DIMETHYLAMINO)PROPYL]-3-[2-(4-PHENYL-1-PIPERAZINYL)ETHYL]-2,4-(1H, 3H)QUINAZOLINEDIONE DIOXALATE (TR 2997)

To 13.0 g (0.037 mole) of 3-[2-(4-phenyl-1-piperazyl) ethyl]-22,42,41H, 3H) quinazolinedione in 200 ml of dry xylene was added 1.8 g (0.04 mole) of NaH with stirring under nitrogen. The solution was heated under reflux for 4 hours. The reaction mixture was cooled and another 1.9 g of NaH was added along with 6.3 g (0.037 mole) of 3-chloro-N,N-dimethylpropylamine hydrochloride. The solution was then stirred with refluxing for another 18 hours. The reaction was filtered and the filtrate was concentrated in vacuo giving 8.0 of an oil. The oxalate was prepared by adding 3.2 g (0.036 mole) of oxalic acid to the 8.0 g of free base in methanol. The salt was recrystallized from methanol: yield 4.0 g; m.p. 124°–216°C.

| Calculated for $C_{29}H_{37}N_5O_{10}$: | C, 56.67; H, 6.06; N, 11.38 |
|---|---|
| Found: | C, 56.74; H, 6.46; N, 11.57 |

EXAMPLE 5

1-[3-(N,N-DIMETHYLAMINO)PROPYL]-3-[6-(4-PHENYL-1-PIPERAZINYL)HEXYL]-2,4(1H,3H)QUINAZOLINEDIONE DIOXALATE (TR 3013)

To 14.5 g (0.0355 mole) of 3-[6-(4-phenyl-1-piperazinyl) hexyl]-2,4(1H, 3H)quinazdinedion in 250 ml of dry xylene was added 2.0 g of NaH with stirring under nitrogen. The reaction mixture was heated under reflux for 4 hours. The solution was cooled and another 2.0 g of NaH was added along with 5.5 g (0.035 mole) of 3-chloro-N,N-dimethyl-propylamine hydrochloride. The reaction was heated under reflux for another 18 hours. The solution was filtered and the filtrate was concentrated in vacuo. 18.0 g of an oil was obtained which was dissolved in 2-propanol, and converted to the oxalate by adding 6.5 g (0.072 mole) of oxalic acid. A solid precipitated which was recrystallized from aqueous 2-propanol: yield 11.0 g; m.p. 143°–144°C.

| Calculated for $C_{33}H_{45}N_5O_{10}$: | C, 59.01; H, 6.76; N, 10.44 |
|---|---|
| Found: | C, 59.48; H, 7.05; N, 10.72 |

EXAMPLE 6

1-[3-(N,N-DIMETHYLAMINO)PROPYL]-3-[3-(N,N-DIMETHYLAMINO)PROPYL]-2,4-(1H, 3H)QUINAZOLINEDIONE DIOXALATE (TR 3027)

To 19.0 g (0.077 mole) of 3-[3-(N,N-dimethylamino) propyl]-2,4(1H, 3H)quinazolinedione in 250 ml of dry xylene was added 3.7 g of NaH with stirring under nitrogen. The reaction mixture was heated under reflux for 4 hours. The solution was cooled and another 3.7 g of NaH was added along with 12.7 g (0.077 mole) of 3-chloro-N,N-dimethylpropylamine hydrochloride. The reaction was heated under reflux for another 4 hours. The solution was filtered and the filtrate was concentrated in vacuo. There was obtained 24.0 g (0.07 mole) of an oil. The oxalate was prepared by adding 13.0 g (0.14 mole) of oxalic acid in methanol to the free base in methanol. Upon addition of ether a solid formed which was recrystallized from water, methanol and ether: yield 20.0 g; m.p. 118°–190°C.

| Calculated for $C_{22}H_{32}N_4O_{10}$: | C, 51.55; H, 6.29; N, 10.93 |
|---|---|
| Found: | C, 51.11; H, 6.32; N, 11.15 |

1-[3-(N,N-dimethylamino)propyl]-3-[3-(N,N-diethyl-amino)propyl]-and 1-[3-(N,N-dimethylamino)propyl]-3-[3-(N,N-dipropylamino)propyl]-2,4(1H,3-H))-quinazolinedione are prepared in a similar fashion.

EXAMPLE 7

6-CHLORO-1-[3-(N,N-DIMETHYLAMINO)PROPYL]-3-[3-(4-PHENYL-1-PIPERAZINYLPROPYL-2,4-(1H,3H)QUINAZOLINEDIONE DIOXALATE (TR 3033)

To 16.0 g (0.04 mole) of 6-chloro-3-[3-(4-phenyl-1-piperazyl)propyl]-2,4(1H,3H)quinazolinedione in 250 ml of xylene was added 2.0 g of NaH with stirring under nitrogen. The reaction mixture was heated under reflux for 4 hours. The solution was cooled and another 2.0 g of NaH was added along with 6.3 g (0.04 mole) of 3-chloro-N,N-dimethylpropylamine hydrochloride. The solution was heated under reflux for another 18 hours. The solution was filtered and the filtrate was concentrated in vacuo. The resulting oil solidified. The solid was recrystallized from methanol, yield: 15.0 g; m.p. 98°–100°C.

| Calculated for $C_{26}H_{34}ClN_5O_2$: | C, 64.52; H, 7.08; N, 14.47 |
|---|---|
| Found: | C, 65.26; H, 7.38; N, 14.37 |

The oxalate was prepared by adding 5.4 g (0.054 mole) of oxalic acid to the 15.0 g of free base in methanol. A solid precipitated which was recrystallized from aqueous methanol: yield, 15.0 g; m.p. 124°–125°C.

| Calculated for $C_{30}H_{38}ClN_5O_{10}$: | C, 54.25; H, 5.77; N, 10.55 |
|---|---|
| Found: | C, 54.44; H, 5.82; N, 10.95 |

5-chloro-, 7-chloro-, and 8-chloro-1-[3-(N,N-dimethyl-amino)propyl]-3-[3-(4-phenyl-1-piperazinyl]-2,4(1H, 3H)-quinazolinedione are similarly synthesized. Positions 5 through 8 of the quinazolinedione nucleus can be substituted with fluoro, bromo, and iodo groups.

EXAMPLE 8

6-NITRO-1-[3-(N,N-DIMETHYLAMINO)PROPYL]-3-[3-(4-PHENYL-1-PIPERAZINYL)-PROPYL]-2,4(1H, 3H) QUINAZOLINEDIONE DIHYDROCHLORIDE MONOHYDRATE (TR 3036)

To 16.0 g (0.04 mole) of 6-nitro-3-[3-(4-phenyl-1-piperazinyl)propyl]-2,4(1H,3H)-quinazolinedione in 300 ml of xylene was added 2.0 g of NaH with stirring under nitrogen. The solution was heated under reflux for 4 hours. The mixture was cooled and another 2.0 g of NaH was added along with 6.3 g (0.04 mole) of 3-chloro-N,N-dimethylpropylamine hydrochloride. The solution was heated under reflux for 2 hours and then filtered. The filtrate was concentrated in vacuo and the residue solidified. The yellow solid was recrystallized from methanol: yield 9.0 g; m.p. 122°–124°C.

| Calculated for $C_{26}H_{36}Cl_2N_6O_5$: | C, 53.52; H, 6.55; N, 14.36 |
|---|---|
| Found: | C, 53.20; H, 6.22; N, 14.21 |

The hydrochloride was prepared by adding 12.1 ml of a 1.65N HCl solution in 2-propanol to 5.0 g of free base in methanol. Upon addition of ether a solid precipitated: yield 5.0 g; m.p. >280°C.

| | |
|---|---|
| Calculated for $C_{26}H_{34}N_6O_4$: | C, 63.13; H, 6.93; N, 16.99 |
| Found: | C, 62.78; H, 7.14; N, 16.62 |

EXAMPLE 9

1-[3-(1PIPERIDYL)PROPYL]-3-[3-(4-PHENYL-1-PIPERAZINYL)PROPYL]-2,4(1H,3H)QUINAZOLINEDIONE DIOXALATE (TR 3044)

To 20.0 g (0.055 mole) of 3-[3-(4-phenyl-1-piperazinyl)propyl]-2,4(1H, 3H) quinazolinedione in 200 ml of xylene was added 2.6 g of NaH with stirring under nitrogen. The solution was heated under reflux for 4 hours. The solution was cooled and another 2.6 g of NaH was added along with 11.8 g (0.055 mole) of N-(3-chloropropyl) piperidine hydrochloride. The mixture was heated under reflux for 4 hours and then filtered. The filtrate was concentrated in vacuo giving an oily residue. The oxalate was prepared by adding 11.0 g of oxalic acid to the 3.0 g of free base. A precipitate formed which was recrystallized from aqueous methanol: yield 19.0 g; m.p. 185°–187°C.

| | |
|---|---|
| Calculated for $C_{33}H_{43}N_5O_{10}$: | C, 59.18; H, 6.47; N, 10.46 |
| Found: | C, 59.09; H, 6.64; N, 10.55 |

EXAMPLE 10

1-[2-(N,N-DIMETHYLAMINO)ETHYL]-3-[3-(4-PHENYL-1-PIPERAZINYl)PROPYL]-2,4(1H,3H)QUINAZOLINEDIONE DIOXALATE (TR 3049)

To 20.0 g (0.055 mole) of 3-[3-(4-phenyl-1-piperazinyl) propyl]-2,4(1H, 3H) quinazolinedione in 300 ml of xylene was added 2.6 g (0.055 mole) of NaH with stirring under nitrogen. The reaction mixture was heated under reflux for 4 hours. The solution was cooled and another 2.6 g of NaH was added along with 8.6 g (0.055 mole) of 2-chloro-N,N-dimethylethylamine hydrochloride. The reaction mixture was then heated for 200 hours. The solution was filtered and the filtrate was concentrated in vacuo giving an oily free base. The oxalate was prepared by adding 5.76 g (0.064 mole) of oxalic acid in methanol to the free base. Upon addition of ether a solid formed which was recrystallized from water, methanol and ether: yield 7.0 g; m.p. 250°–251°C.

| | |
|---|---|
| Calculated for $C_{29}H_{37}N_5O_{10}$: | C, 56.58; H, 6.05; N, 11.38 |
| Found: | C, 57.09; H, 6.32; N, 11.71 |

EXAMPLE 11

6-ACETAMIDO-1-[3-(N,N-DIMETHYLAMINO)PROPYL]-3-[3-(4-PHENYL-1-PIPERAZINYL)-PROPYL]-2,4(1H,3H)QUINAZOLINE-DIONE DIOXALATE MONOHYDRATE (TR 3081).

To 7.0 g (0.014 mole) of 6-nitro-1-[3-(N,N-dimethyl-amino)propyl]-3-[3-(4-phenyl-1-piperazyl)propyl]-2,4 (1H, H,3H)quinazolinedione was added 200 ml of acetic acid, 100 ml of acetic anhydride and 3.0 g of 10% Pd on carbon. The mixture was hydrogenated under 50 lbs/in². The calculated amount of hydrogen was taken up in 1 hour. The solution was filtered and the filtrate was concentrated in vacuo. The residue was treated with ammonium hydroxide and the organic material was extracted with chloroform. The chloroform was washed with water and then dried over $MgSO_4$. The chloroform was concentrated in vacuo leaving an oily free base. The oxalate was prepared by adding 2.5 g (0.028 mole) of oxalic acid to the free base in methanol. Upon addition of ether a solid formed, which was recrystallized from aqueous methanol: yield 5.5 g; m.p. 154°–156°C.

| | |
|---|---|
| Calculated for $C_{32}H_{44}N_6O_{12}$: | C, 54.55; H, 6.30; N, 11.94 |
| Found: | C 54.41; H, 6.39; N, 11.97 | positions 5 through 8 of the quinazolinedione nucleus may be substituted by acetamido and propylamido groups.

EXAMPLE 12

1-[3-(N,N-DIMETHYLAMINO)PROPYL]-3-[3-(4-PHENYL-1-PIPERAZINYL)PROPYL]-2,4-(1H, H,3H)-QUINAZOLINEDIONE DIOXALATE MONOHYDRATE (TR 3083)

To 20 g (0.055 mole) of 3-[3-(4-phenyl-1-piperazinyl) propyl]-2,4(1H, H,3H)quinazolinedione in 250 ml of xylene was added 2.5 of NaH with stirring under nitrogen. The solution was heated under reflux for 4 hours. The solution was cooled and another 2.5 g of NaH was added along with 10.2 g (0.055 mole) of 3-chloro-N,N-diethylpropyl-amine hydrochloride. The reaction mixture was heated under reflux for 18 hours. The solution was filtered and the filtrate was concentrated in vacuo leaving an oily free base. The oxalate was prepared by adding 10.6 g (0.12 mole) of oxalic acid to 28 g of free base in methanol. Upon addition of ether a solid formed which was recrystallized from water, methanol and ether: yield 17.0 g; m.p. 122°–123°C.

| | |
|---|---|
| Calculated for $C_{32}H_{45}N_5O_{11}$: | C, 56.88; H, 6.72; N, 10.37 |
| Found: | C, 57.14; H, 6.49; N, 10.30 |

EXAMPLE 13

6,7-DIMETHOXY-1[3-(N,N-DIMETHYLAMINO)PROPYL]-3-[3-(4-PHENYL-1PIPERAZINYL)PROPYL]-2,4-(1H,3H) H)QUINAZOLINEDIONE DIHYDROCHLORIDE (TR 3094)

To 15 g (0.034 mole) of 3-[3-(4-phenyl-1-piperazyl) propyl]-6,7-dimethoxy-2,4(1H,3H)quinazolinedione in 250 ml of xylene was added 1.7 g of NaH with stirring under nitrogen. The solution was heated under reflux for 4 hours. The solution was cooled and another 1.7 g of NaH was added along with 5.0 g (0.035 mole) of 3-chloro-N,N-dimethylpropylamine hydrochloride. The solution was heated under reflux for another 4 hours. The reaction mixture was filtered and the filtrate was concentrated in vacuo giving 17.0 of an oily free base. The hydro-chloride was prepared by adding 40 ml of a 1.7N HCl solution in 2-propanol to the free base. Upon addition of ether a solid formed which was recrystallized from water, methanol and ether: yield 11.0 g; m.p. 260°–261°C.

| Calculated for $C_{28}H_{41}Cl_2N_5O_4$: | C, 57.72; H, 7.02; N, 12.05 |
|---|---|
| Found: | C, 56.93; H, 7.20; N, 12.01 |

6,7-diethoxy- and 6,7-dipropoxy-1-[3-(N,N-dimethyl-amino)propyl]-3-[3-(4-phenyl-1-piperazinyl)propyl]-2,4 (1H, H,3H)quinazolinedione are likewise prepared.

EXAMPLE 14

1[3-(N,N-DIMETHYLAMINO)PROPYL]-3-[3-(4-o-METHYLPHENYL-1-PIPERAZINYL)-PROPYL]-2,4(1H,3H)QUINAZOLINEDIONE DIOXALATE (TR 3128)

To 15.0 g(0.04 mole) of 3-(-[3-(4-o-methylphenyl-1-piperazinyl)propyl]-2,4-(1H,3H) quinazolinedione in 250 ml of xylene was added 2.0 g of NaH with stirring under $N_2$. The solution was heated under reflux for 4 hours. The mixture was cooled and another 2.0 g of NaH was added along with 6.3 g (0.04 mole) of 3-chloro-N,N-dimethyl-propylamine hydrochloride. The solution was heated under reflux for 8 hours with stirring. The solution was filtered and the filtrate concentrated in vacuo leaving 19.0 g of an oil. The oxalate was prepared by adding 7.4 g (0.08 mole) of oxalic acid in $CH_3OH$ to the free base. Upon addition of ether a solid formed which was recrystallized from methanol: yield 5.5 g; m.p. 143°–145°C.

| Calculated for $C_{31}H_{41}N_5O_{10}$: | C, 57.84; H, 6.42; N, 10.88 |
|---|---|
| Found: | C, 57.11; H, 6.34; N, 10.58 |

1-[3-(N,N-dimethylamino)propyl]-3-[3-(4-m-ethylphenyl-1-piperazinyl)propyl]-2,4(1H,3H)quinazolinedione and 1-[3-(N,N-dimethylamino)propyl]--[4-p-butyl-phenyl-1-piperazinyl)propyl]-2,4(1H,3H)quinazolinedione similarly are synthesized.

EXAMPLE 15

1-[3-(N,N-DIMETHYLAMINO)PROPYL]-3-[7-(4-PHENYL-1-PIPERAZINYL)HEPTYL]-2,4(1H, 3H) QUINAZOLINEDIONE DIOXALATE METHANOLATE (TR 3169)

This compound has been prepared by a synthesis described in Example 5. TR 3169 has a melting point of 154°–155°C.

| Calculated for $C_{35}H_{51}N_5O_{11}$: | C, 58.56; H, 7.17; N, 9.76 |
|---|---|
| Found: | C, 58.30; H, 7.29; N, 9.91 |

EXAMPLE 16

1-[3-(1-PIPERIDYL)PROPYL]-3-[6-(4-PHENYL1-PIPERAZINYL)HEXYL]-2,4-(1H, 3H)QUINAZOLINEDIONE DIOXALATE (TR 3173)

This compound has been prepared by a synthesis described in Example 9 above. TR3173 has a metling point of 132°–134°C.

| Calculated for $C_{36}H_{49}N_5O_{10}$: | C, 60.74; H, 6.95; N, 9.83 |
|---|---|
| Found: | C, 61.57; H, 6.87; N, 10.06 |

EXAMPLE 17

1-[3-(N,N-DIMETHYLAMINO)PROPYL]-3-[6-(4-m-CHLOROPHENYL-1PIPERAZINYL)HEXYL]-2,4(1H, 3H)QUINAZOLINEDIONE DIOXALATE (TR 3171)

This compound has been prepared by a snythesis described in Example 1 above. TR3171 has a melting point of 132°–133°C.

| Calculated for $C_{33}H_{49}N_5O_{10}$: | C, 56.12; H, 6.28; N, 9.92 |
|---|---|
| Found: | C, 55.47; H, 6.24; N, 10.36 |

EXAMPLE 18

For convenience the identification numbers which are enclosed in parenthesis after the compounds listed as illustrations of Formula I in the SUMMARY and as examples in this section are utilized rather than I.U.P.A.C. nomenclature.

A. VASODILATION ACTIVITY

The capacity of compounds of this invention for inducing vasodilation was assessed in the femoral bed of anesthetized dogs. Blood flow was measured with a calibrated electromagnetic flowmeter sensor placed around a femoral artery. Compounds were injected intraarterially at increasing doses through a branch of the main vessel and peak increases in flow after each dose were noted. The data obtained were used to plot dose-response curves and the ED 100 ml/min (the effective dose for increasing flow by 100 ml/min over control values) was calculated for each compound by extrapolation from the curves. Papaverine, which directly acts on vascular smooth muscle, was tested for comparison (Table I).

Table I

| Compound | ED 100 ml/min (mcg) | Compound | ED 100 ml/min (mcg) |
|---|---|---|---|
| TR2479 | 97 | TR3044 | 281 |
| TR2957 | 134 | TR3049 | >2000 |
| TR2967 | 96 | TR3081 | 187 |
| TR2997 | 388 | TR3083 | 399 |
| TR3013 | 4 | TR3094 | >2000 |
| TR3027 | >2000 | TR3128 | 36 |
| TR3033 | >2000 | Papaverine | 1825 |
| TR3036 | 54 | | |

B. ANTIHYPERTENSIVE ACTIVITY

Arterial hypertension was produced in female Wistar rats by applying a figure of eight ligature to one kidney and removing the contralateral kidney, as described by Grollman (Proc. Soc. Exper. Biol. Med., 57:102 [1944]). Systolic blood pressure was determined indirectly in the tail with an inflatable occluding cuff and a pulse detector. Animals with systolic pressures exceeding 160 mmHg were considered hypertensive and were used for evaluation of compounds. Pressures were determined in groups of ten animals before and 2, 4, 6 and 8 hr after oral administration of drugs at a dose of 31 mg/kg. Mean decreases in blood pressure observed over the 8 hr period of observation were used as a measure of antihypertensive effect (Table II).

Table II

| Compound | Decrease in Systolic BP (mmHg) | Compound | Decrease in Systolic BP (mmHg) |
| --- | --- | --- | --- |
| TR2479 | 26 | TR3036 | 25 |
| TR2957 | 47 | TR3044 | 29 |
| TR2967 | 3 | TR3049 | 17 |
| TR2997 | 38 | TR3081 | 2 |
| TR3013 | 35 | TR3083 | 0 |
| TR3027 | 1 | TR3094 | 7 |
| TR3033 | 12 | TR3128 | 12 |

C. ALPHA ADRENERGIC BLOCKING ACTIVITY

In order to rule out the possibility of the present compounds producing vasodilation and hypotension through blockade of alpha adrenergic receptors, their influence on responses to epinephrine was assessed in the rabbit aortic strip. Preparations were set up as described by Furchgott and Bhadrakom (J. Pharmacol. Exper. Ther., 108:129 [1953]). After sensitization by repeated contact with 0.01 mcg/ml of epinephrine, responses to this concentration of the catecholamine were compared with those obtained after incubation for 200 sec with increasing concentrations of the test compounds. Percent blockade of responses observed after each concentration were calculated with the corresponding EC 50 (the effective concentration blocking responses by 50 percent) was determined by extrapolation from the dose-response curve. The alpha adrenergic blocking agent phentolamine was tested for comparison. It is apparent from table III that the compounds were inactive as antiadrenergic agents or were considerably less potent than phentolamine.

Table III

| Compound | EC 50 (mcg/ml) | Compound | EC 50 (mcg/ml) |
| --- | --- | --- | --- |
| TR2479 | >1.00 | TR3044 | >1.00 |
| TR2957 | >1.00 | TR3049 | 0.30 |
| TR2967 | >1.00 | TR3081 | 0.31 |
| TR2997 | 0.51 | TR3083 | >1.0 |
| TR3013 | 1.00 | TR3094 | 1.00 |
| TR3027 | >1.0 | TR3128 | 0.73 |
| TR3033 | 1.00 | Phentolamine | 0.03 |
| TR3036 | 0.55 | | |

What is claimed is:
1. A compound having the formula

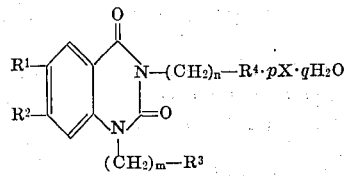

wherein:
 $R^1$ is selected from the group consisting of hydrogen, chloro, nitro, methoxy, and acetamido;
 $R^2$ is selected from the group consisting of hydrogen and methoxy with the proviso that $R^2$ is methoxy only when $R^1$ is methoxy;
 $R^3$ is selected from the group consisting of piperidyl, dimethylamino, and diethylamino;
 $R^4$ is selected from the group consisting of

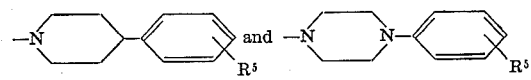

in which $R^5$ is selected from the group consisting of hydrogen, chloro, and methyl;
 $m$ is an integer having a value of from 2 to 3;
 $n$ is an integer having a value of from 2 to 7;
 X is a pharmacologically acceptable, non-toxic acid; and
 $p$ and $q$ are 0 or integers having a value of from 1 to 2.

2. The compound as in claim 1, 1-[3-(N,N-dimethylamino)-propyl]-3[3-(4-m-chlorophenyl-1-piperazyl)propyl]-2,4-(1H,3H)quinazolinedione dihydrochloride.

3. The compound as in claim 1, 1-[3-(N,N-dimethylamino)-propyl]-3[3-(4-phenyl-1-piperazinyl)propyl]2,4(1H,3H)-quinazolinedione dehydrochloride.

4. The compound as in claim 1, 1-[3-(N,N-dimethylamino)-propyl]-3[3-(4-phenyl-1-piperidyl)propyl]-2,4(1H,3H)-quinazolinedione dihydrochloride.

5. The compound as in claim 1, 1-[3-(N,N-dimethylamino)-propyl]-3[2-(4-phenyl-1-piperazinyl)ethyl]2,4(1H,3H)-quinazolinedione dioxalate.

6. The compound as in claim 1, 1-[3-(N,N-dimethylamino)-propyl]-3-[6-(4-phenyl-1-piperazinyl)hexyl]-2,4(1H,3H)-quinazolinedione dioxalate.

7. The compound as in claim 1, 6-chloro-1-[3-(N,N-dimethylamino)propyl]-3-[3-(4-phenyl-1-piperazyl]-2,4-(1H3H)quinazolinedione dioxalate.

8. The compound as in claim 1, 6-nitro-1-[3-(N,N-dimethylamino)propyl]-3-[3-(4-phenyl-1piperazinyl)-propyl]-2,4(1H,3H)quinazolinedione dihydrochloride hydrate.

9. The compound is as in claim 1, 1-[3-(1-piperidyl)-propyl]-3-[3-(4-phenyl-1-piperazinyl)propyl]-2,4-(1H,3H)-quinazolinedione dioxalate.

10. The compound as in claim 1, 1-[2-(N,N-dimethylamino)-ethyl]-3-[3-(4-phenyl-1-piperazinyl(-propyl]2,4(1H,3H)-quinazolinedione dioxalate.

11. The compound as in claim 1, 6-acetamido-1-[3-N,N-dimethylamino)propyl]-3-[3-(4-phenyl-1-piperazinyl)-propyl]-2,4(1H,3H)quinazolinedione dioxalate hydrate., 12. The compound as in claim 1, 1-[3-(N,N-diethylamino)-propyl]-3-[3-(4-phenyl-1-piperazinyl)- propyl]2,4(1H,3H)-quinazolinedione dioxalate hydrate.

13. The compound as in claim 1, 6,7-dimethoxy-1[3-(N,N-dimethylamino)propyl]-3-[3-(4-phenyl-1-piperazyl)-propyl]-2,4-(1H,3H)quinazolinedione dihydrochlroide.

14. The compound as in claim 1, 1-[3-(N,N-dimethylamino)-propyl]-3-[3-4o-methylphenyl-1-piperazinyl)-propyl]-2,3(1H,3H)quinazolinedione.

15. The compound as in claim 1, 1-[3-(N,N-dimethylamino)-propyl]-3-[7-(4-phenyl-1-piperazinyl)heptyl]-2,4-(1H,3H)Quinazolinone dioxalate methanolate.

16. The compound as in claim 1, 1-[3-(1-piperidyl)propyl]-3-[6-(4-phenyl-1-piperazinyl)hexyl]-2,4(1H,3H)quinazolinedione dioxalate.

17. The compound as in claim 1, 1-[3-N,N-dimethylamino)-propyl]-3-[6-(4-m-chlorophenyl-1-piperazinyl)-hexyl]-2,4-(1H,3H)quinazolinedione dioxalate.

* * * * *